(12) United States Patent
Antreich

(10) Patent No.: US 6,666,494 B2
(45) Date of Patent: Dec. 23, 2003

(54) FOLDING CONVERTIBLE TOP FOR A MOTOR VEHICLE

(75) Inventor: Michael Antreich, Germering (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 0 days.

(21) Appl. No.: 10/313,008

(22) Filed: Dec. 6, 2002

(65) Prior Publication Data
US 2003/0127883 A1 Jul. 10, 2003

(30) Foreign Application Priority Data
Dec. 7, 2001 (DE) .......................... 101 60 240

(51) Int. Cl.⁷ ............................................. B60J 10/10
(52) U.S. Cl. .................. 296/107.01; 296/117; 296/116; 296/107.07; 296/107.09
(58) Field of Search ............................ 296/107.01, 116, 296/107.09, 107.17, 107.18, 108, 121, 122, 146.14, 107.04, 117, 107.07; 280/651

(56) References Cited

U.S. PATENT DOCUMENTS

| | | | | |
|---|---|---|---|---|
| 1,952,252 A | * | 3/1934 | Heuser | 296/117 |
| 3,575,464 A | * | 4/1971 | Himka et al. | 296/117 |
| 4,958,882 A | * | 9/1990 | Kolb | 296/117 |
| 5,004,291 A | * | 4/1991 | Bauer et al. | 296/116 |
| 5,335,959 A | * | 8/1994 | Schrader et al. | 296/116 |
| 5,816,644 A | * | 10/1998 | Rothe et al. | 296/117 |
| 5,903,119 A | * | 5/1999 | Laurain et al. | 296/107.09 |
| 5,998,948 A | * | 12/1999 | Lange et al. | 296/122 |
| 6,039,382 A | * | 3/2000 | Mather et al. | 296/107.01 |
| 6,270,143 B1 | * | 8/2001 | Heselhaus et al. | 296/107.01 |
| 6,283,532 B1 | * | 9/2001 | Neubrand | 296/107.07 |
| 6,322,130 B1 | * | 11/2001 | Wanden et al. | 296/107.01 |
| 6,390,531 B1 | * | 5/2002 | Schutt | 296/116 |
| 6,409,247 B1 | * | 6/2002 | Maass | 296/116 |
| 6,478,362 B2 | * | 11/2002 | Obendiek | 296/108 |
| 2001/0017475 A1 | | 8/2001 | Busch | |
| 2002/0005653 A1 | * | 1/2002 | Heselhaus et al. | 296/107.07 |
| 2002/0021020 A1 | * | 2/2002 | Heselhaus et al. | 296/107.09 |
| 2002/0074822 A1 | * | 6/2002 | Rothe et al. | 296/107.07 |
| 2003/0038501 A1 | * | 2/2003 | Heselhaus | 296/107.09 |
| 2003/0052507 A1 | * | 3/2003 | Obendick et al. | 296/107.01 |

FOREIGN PATENT DOCUMENTS

| | | | |
|---|---|---|---|
| DE | 297 10 720 | * | 5/1998 |
| DE | 299 01 589 | * | 6/2000 |
| DE | 100 29 471 | * | 1/2002 |
| DE | 100 29 478 | * | 1/2002 |
| EP | 0 749 859 | * | 12/1996 |
| EP | 0 952 022 | * | 10/1999 |
| EP | 1 101 642 | * | 5/2001 |
| EP | 1 127 725 A2 | | 8/2001 |
| EP | 1 285 801 | * | 2/2003 |
| WO | WO 02/43978 | * | 6/2002 |

* cited by examiner

*Primary Examiner*—Kiran Patel
(74) *Attorney, Agent, or Firm*—Nixon Peabody LLP; David S. Safran

(57) ABSTRACT

A folding convertible top (1) of a motor vehicle with a convertible top frame (3) which has a front, a middle and a rear frame part (4, 5, 6) at each lateral side of the roof. The middle frame part (5) is displaceably supported via a main bearing means (6, 16) on the body and the front frame part (4) is displaceable relative to the middle frame part (5) via a connecting rod means (20, 23), the middle frame part (5) having a seal bearer (12) which is hinged on the middle frame part (5). When the folding convertible top (1) is lowered, the front end (36) of the seal bearer is swung outward in a transverse direction.

12 Claims, 4 Drawing Sheets

FOLDING CONVERTIBLE TOP FOR A MOTOR VEHICLE

BACKGROUND OF THE INVENTION

1. Field of the Invention

The invention relates to a folding convertible top of a motor vehicle with a convertible top frame which laterally has a front, a middle and a rear frame part, of which the middle frame part is displaceably supported via a main bearing means on the body and the front frame part is displaceable relative to the middle frame part via a connecting rod means which has a front connecting rod, a rear connecting rod and an intermediate connecting rod.

2. Description of Related Art

Published European Patent application EP 1 127 725 and corresponding U.S. Patent Application Publication 2001/0017475 A1 (application Ser. No. 09/791,752) discloses one such folding convertible top in which the front connecting rod directly joins the front frame part to the middle frame part and the rear connecting rod is hinged between the front frame part and the intermediate connecting rod. In the lowered position, the front connecting rod is swung to the rear about an articulated connection which is located on the front end of the middle frame part. When the middle frame part comes to rest in the lowered position laterally next to the motor vehicle seat, the inner front connecting rod requires additional structural space laterally in the direction to the shoulder area of an individual sitting in a vehicle seat.

SUMMARY OF THE INVENTION

The primary object of the present invention is to provide a folding convertible top of the initially-mentioned type with an improved and simplified structure for obtaining of different roof positions and an improved lowered position, especially for greater shoulder freedom on a seat adjacent to the lowered folding convertible top.

This object is achieved in a roof in accordance with the invention in that the front connecting rod is pivotally coupled to the front frame part and to the front section of the intermediate connecting rod, that the rear connecting rod is pivotally coupled to the front frame part and to the middle frame part, and that the intermediate connecting rod is pivotally connected to the rear connecting rod by means of a joint and is pivotally connected to the main bearing means on its rear section. Since only the rear connecting rod of the connecting rod means which supports the front frame part is supported on the middle frame part, the middle frame part can be made shorter, especially when driving takes place via the main connecting rod which is coupled to the middle frame part in front of the main column.

This advantage is especially apparent when the middle frame part has a seal bearer which is pivotally supported on the middle frame part, and when the folding convertible top is lowered, its front end swings in the transverse direction, especially outward. While the seal bearer in the closed state flushly adjoins the seal bearer on the front frame part and the seal bearer on the rear frame part, the middle frame part can be made clearly shorter. The lowered folding convertible top can be deposited behind the seat in a short lengthwise extension in a position which is favorable with respect to the lengthwise direction of the motor vehicle. The seal bearers which have been swung out to the side can be deposited next to the seats and thus allow a greater seat width.

The object is also achieved by a folding convertible top with the features that the middle frame part has a seal bearer which is hinged on the middle frame part, and when the folding convertible top is lowered, the front end is swung in the transverse direction, especially outward.

In these or generally in comparably built folding convertible tops, the aforementioned advantages of the space-saving deposition of the folding convertible top is achieved by the seal bearer which is pivotally supported on the middle frame part.

The seal bearer is moved preferably via forced coupling with the rear connecting rod during its swinging motion. Forced coupling is achieved preferably by a coupling rod which is hinged on both ends and which executes a swinging motion by eccentric coupling in an operationally reliable manner.

The folding convertible top of the invention is explained in detail below using one embodiment with reference to the accompanying drawings.

DETAILED DESCRIPTION OF THE DRAWINGS

Figure 1:
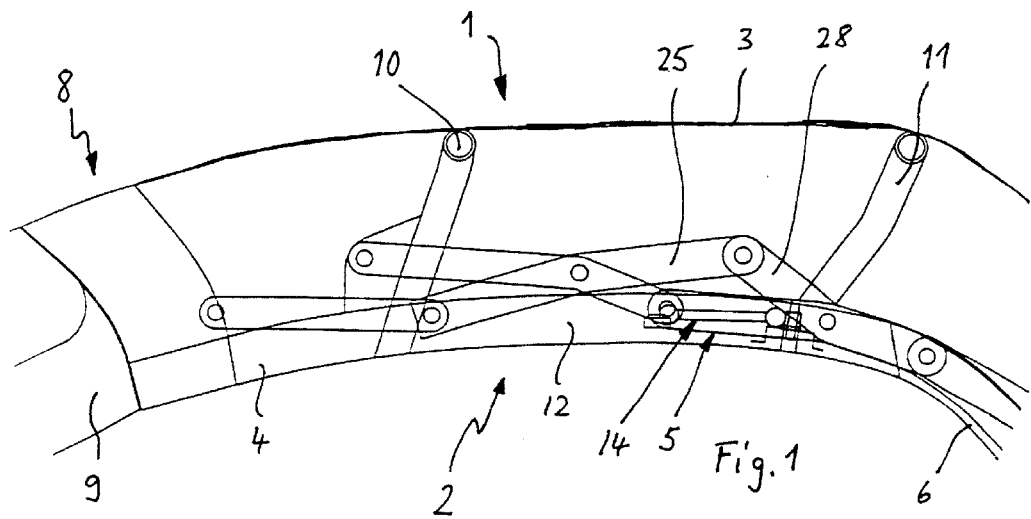
FIG. 1 shows is a schematic side view of a portion of a folding convertible top of a cabriolet in the closed position.

A folding convertible top 1 of a motor vehicle has a convertible top frame 2 and convertible top material 3 which is held by the convertible top frame 2. The convertible top frame 2 is built symmetrically to the vertical lengthwise center plane of the vehicle and has a front frame part 4, a middle frame part 5 and a rear frame part 6 on each side. In the closed position of the folding convertible top 1 which is shown in FIG. 1, the front frame part 4, the middle frame part 5 and the rear frame part 6 run essentially along the upper edge of at least one side window of the motor vehicle of the respective side.

The two laterally opposite front frame parts 4 are made as seal bearers for a respective seal and are rigidly connected to one another by means of a front bow 7 that forms a front roof part or a roof crest 8 which, in the closed position, adjoins the windshield apron 9 of the motor vehicle and is held locked to it. To the rear of the front bow 7, the roof crest 8 is formed by a support bow 10 which permanently connects the back end of front frame parts 4 to one another. The convertible top material 3 covers the front bow 7 or it is attached to the back end of the front bow 7 flush with its surface and is tensioned to the rear via the support bow 10. Alternatively the entire roof crest 8, including the two bows 7, 10 and the front frame parts 4, can be a rigid unitary component, and the convertible top material 3 is tensioned over the entire fixed roof crest 8 or it begins on the back end of the roof crest 8 or on the support bow 10.

The two laterally opposing middle frame parts 5 are rigidly connected to one another via a main bow 11 via which, at least in the closed state of the roof, the convertible top material 3 is tensioned. On the middle frame part 5, the seal bearer 12 is supported to be able to pivot around a pivot axis 13 which runs essentially normal to the lengthwise extension of the seal bearer 12 and pivoted by means of a displacement device 14.

Figure 3:
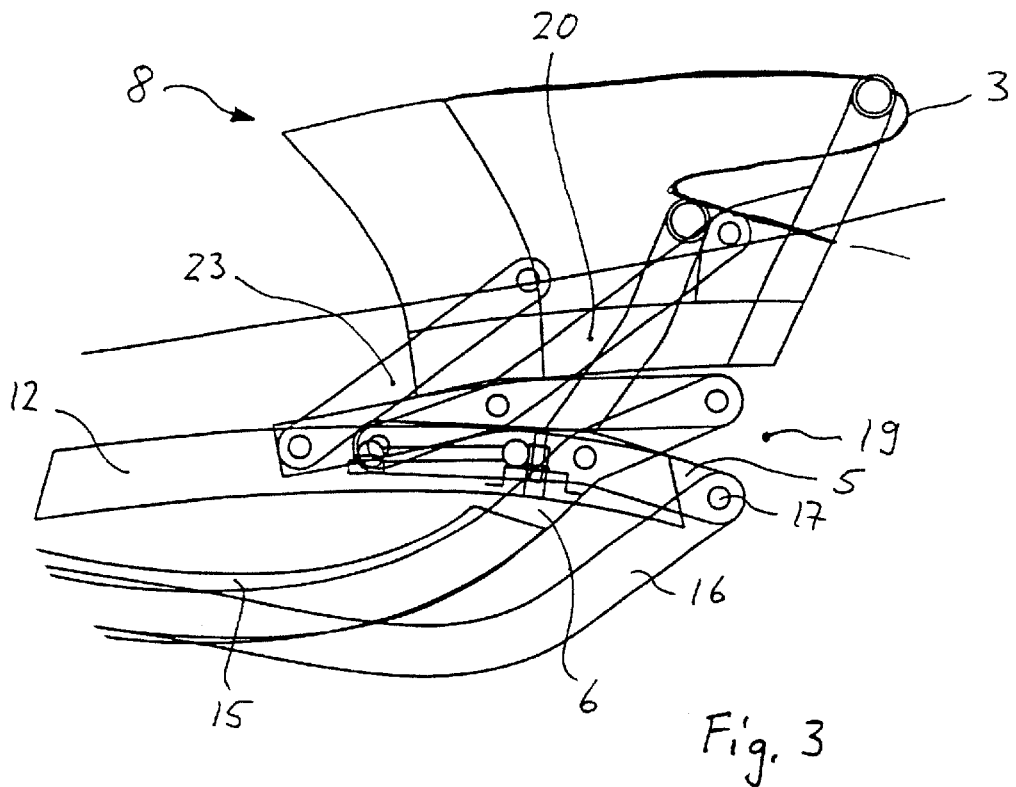
FIG. 3 is a schematic side view of the opened and lowered folding convertible top.

The rear frame part 6, which likewise has a seal bearer 15, constitutes the main connecting rod of a four-bar mechanism which pivotally supports the middle frame part 5 on the vehicle body. The main column 16 of the four-bar mechanism and the main connecting rod or the rear frame part 6 are, on the one hand, pivotally supported on the motor vehicle body in a conventional manner (not shown), and on the other hand, are pivotally supported on the back end of the middle frame part 5 at a joint 17 (main column 16) or a joint 18 (main connecting rod 6) which is spaced away from the back end so that the middle frame part 5, in the known four bar displacement, can be moved to the rear into a convertible top compartment 19 (FIG. 3) or generally into a rear lowered position.

On the front end of the middle frame part 5, the rear connecting rod 20 of a connecting rod means which supports the roof crest 8 is pivotally supported in a joint 21. The opposing end of the rear connecting rod 20 is pivotally coupled to the rear section of the roof crest 8 at a joint 22. The front connecting rod 23 of the connecting rod means is pivotally attached, on the one hand, to the roof crest 8 in a joint 24, and on the other hand, to the front end of an intermediate connecting rod 25 at a joint 26. The intermediate connecting rod 25 is coupled on its back end by means of a joint 27 to the control section 28 of the main connecting rod 6 which extends beyond the joint 18. In addition, the intermediate connecting rod 25 and the rear connecting rod 20 are pivotally connected to one another by means of a joint 29.

Figure 2:
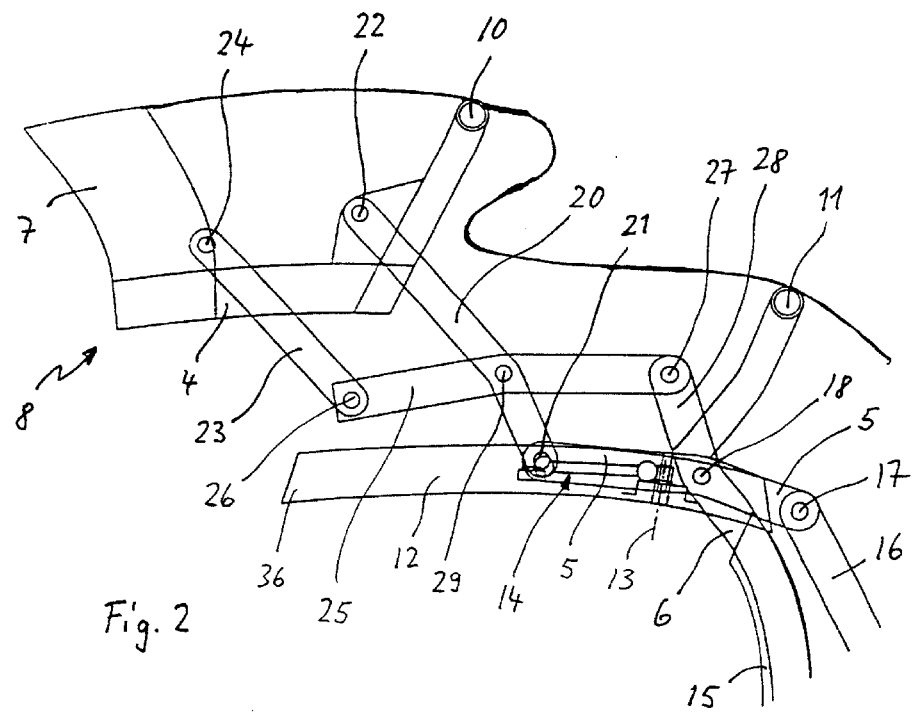
FIG. 2 is a side view like that of FIG. 1 but showing the portion of the folding convertible top during the opening process.

To move the folding convertible top 1 between its closed position (FIG. 1) and its lowered open position (FIG. 3), for example, the main column 16 of the four-bar mechanism is swung via a drive means, by which the middle frame part 5 is moved in a conventional parallel displacement into the convertible top compartment 19. When the four-bar mechanism pivots, the control section 28 of the main connecting rod 6 pulls the intermediate connecting rod 25 to the rear and the connecting rod 25, in turn, pivots the rear connecting rod 20 around its lower joint 21 to the rear. The rear connecting rod 20, which swings to the rear, swings the roof crest 8 to the rear in the direction to the main bow 11 or over it via the connecting rod means (connecting rods 20 and 23) which forms the four-bar mechanism (joints 22, 24, 26, 29), relieving the tensioning of the convertible top material 3, at least in front of the main bow 11 (FIG. 2). In the lowered position (FIG. 3), the roof peak 8 forms a covering of the convertible top frame 2, which covering is identically cambered or curved in the same direction as the convertible top frame 2 so that a convertible top flap or bonnet is not necessary.

The displacement device 14 for the seal bearer 12 has a coupling rod 30 which is connected, on the one hand, to a joint 31 which is located on the inside of the seal bearer 12 adjacent to the pivot axis 13, and on the other hand, is connected to a joint 32 which is attached to the lower end of the rear connecting rod 20 and its pivot axis 33 is located parallel to and offset from the pivot axis 34 of the joint 21. Furthermore, between the front end of the middle frame part 5 and the seal bearer 12, there is a guide 35 for the seal bearer 12.

Figure 6:
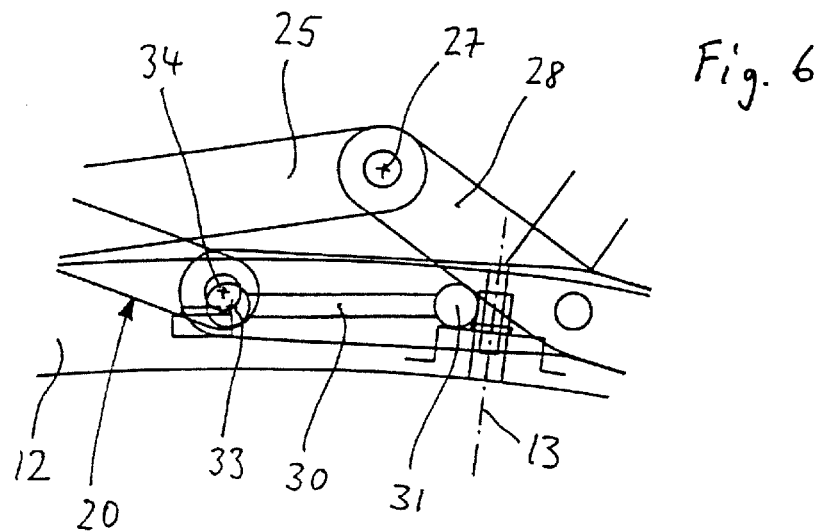
FIG. 6 is a side view of the pivoting mechanism shown in FIG. 4 with the folding convertible top closed.
Figure 4:
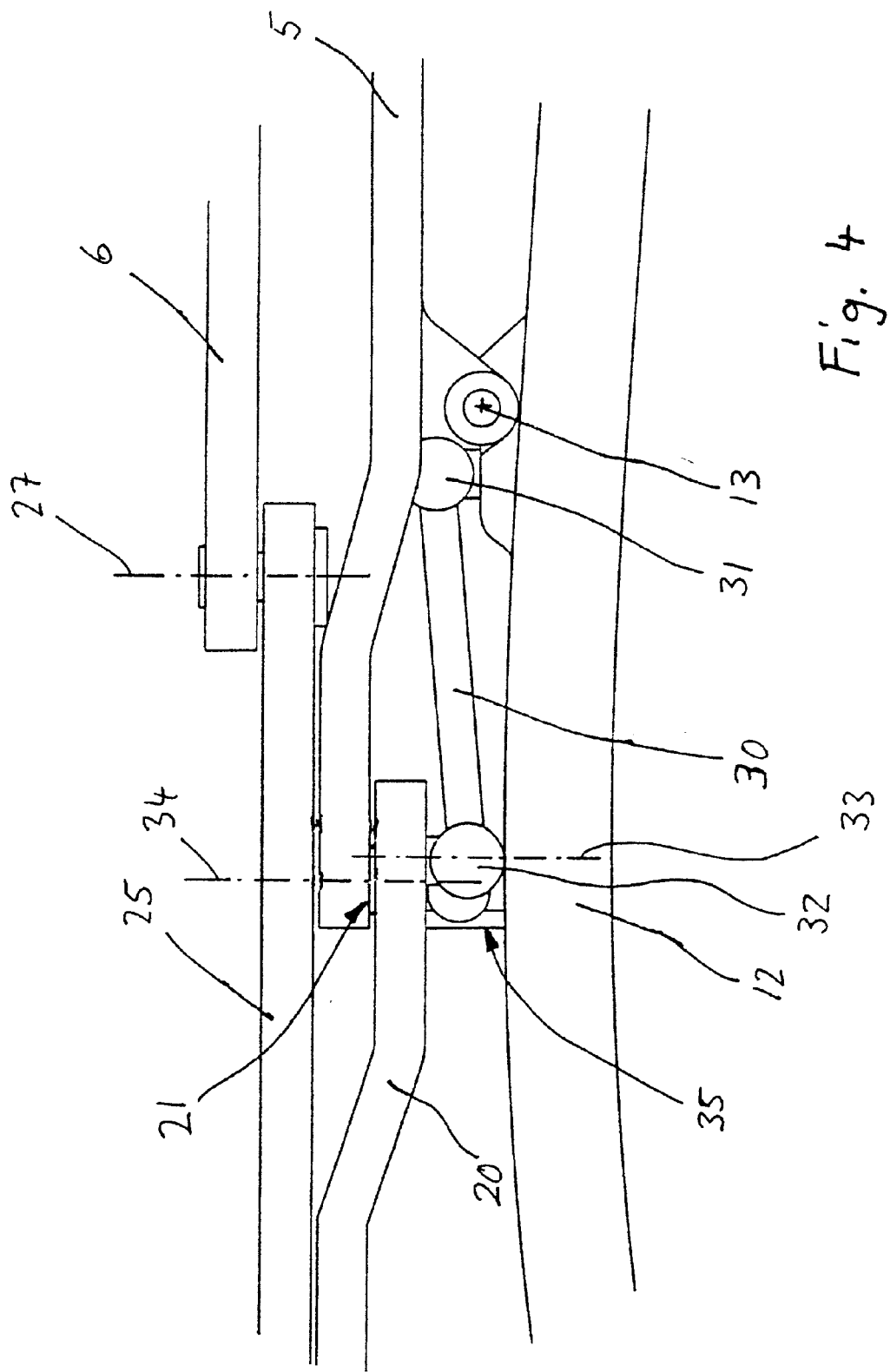
FIG. 4 is a plan view of the pivoting mechanism of the convertible top rod of the folding convertible top with the folding convertible top closed.
Figure 5:
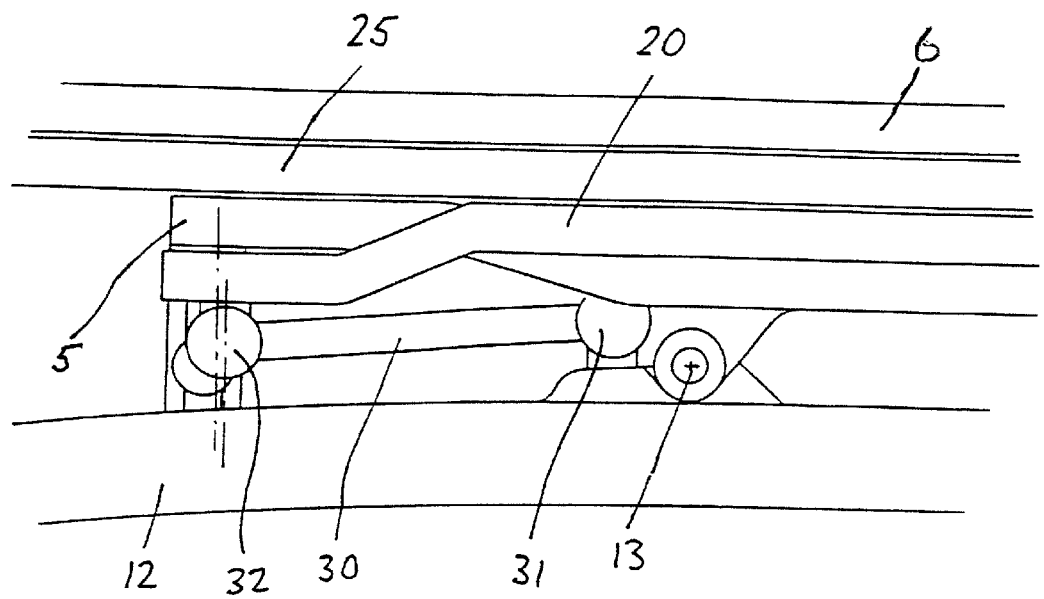
FIG. 5 is a view like that of FIG. 4 but showing the folding convertible top open.
Figure 7:
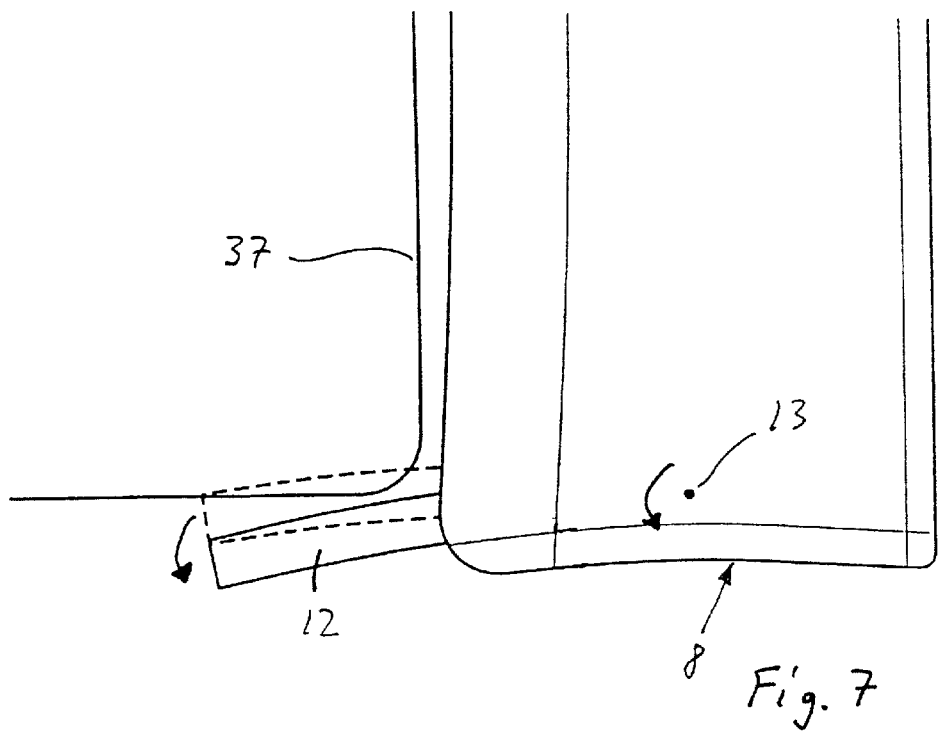
FIG. 7 is a plan view of the opened and lowered folding convertible top.

In the closed position of the folding convertible top 1 (FIGS. 1 & 6), the pivot axis 33 of the joint 32 is positioned such that the opening motion of the convertible top frame 3, and thus of the rear connecting rod 20, moves the joint 32 forward on a circular path around the pivot axis 34. The seal bearer 12 with its front end 36 is pivoted laterally to the outside via the coupling rod 30 which has been pulled forward and the joint 31 which pivots to the outside around the pivot axis 13. Maximum swinging of the front end 36 to the outside is achieved in the lowered position of the folding convertible top (FIG. 7). Since the seal bearer 12 comes to rest laterally next to the backrest 37, the two opposing, swung-out seal bearers 12 allow a greater width of the backrest 37, and thus, improve the available space in the shoulder area on the seats or back seats in the motor vehicle.

What is claimed is:

1. Folding convertible top of a motor vehicle, comprising:
   a convertible top frame which laterally at each side has a front, a middle and a rear frame part, of which the middle frame part has a main bearing means for supporting the middle frame part for movement on a body of the motor vehicle, and of which the front frame part is movable relative to the middle frame part via a connecting rod arrangement which has a front connecting rod, a rear connecting rod and a middle connecting rod,
   wherein the front connecting rod is pivotally coupled to the front frame part and to a front section of the middle connecting rod,
   wherein the rear connecting rod is pivotally coupled to the front frame part and to the middle frame part, and
   wherein the middle connecting rod is pivotally connected to the rear connecting rod by means of a joint and is connected to one of main bearing means and the rear frame part at a rear section of the middle connecting rod.

2. Folding convertible top as claimed in claim 1, wherein the middle frame part has a seal bearer which is pivotally supported on the middle frame part in a manner causing a front end of the seal bearer to swing outward in a transverse direction when the folding convertible top is lowered.

3. Folding convertible top as claimed in claim 2, wherein the seal bearer is movable via a forced coupling with the rear connecting rod during pivoting of the rear connecting rod.

4. Folding convertible top as claimed in claim 3, wherein said forced coupling for moving the seal bearer comprises a coupling rod which is connected on one end to a joint which is located inward of the seal bearer adjacent to the pivot axis of the seal bearer on the middle connecting rod, and at a second end is connected to a joint which is attached to a lower end of the rear connecting rod at a pivot axis located parallel to and offset from the pivot axis of a joint by which the rear connecting rod is coupled to the seal bearer part.

5. Folding convertible top as claimed in claim 2, wherein the seal bearer projects forwardly over the middle frame part.

6. Folding convertible top as claimed in claim 1, wherein the main bearing means which forms a four-bar mechanism having a main connecting rod which contains a rear seal bearer and which is pivotally coupled to the middle frame part by a joint and is hinged to the middle connecting rod at a control section thereof which projects above the joint by which the main connecting rod and the middle frame part are connected.

7. Folding convertible top of a motor vehicle, comprising:
   a convertible top frame which laterally at each side has a front, a middle and a rear frame part, of which the middle frame part is supported via a main bearing means to move on a body of the motor vehicle and of the front frame part is movable relative to the middle frame part via a connecting rod arrangement, wherein the middle frame part has a seal bearer which is hinged on the middle frame part in a manner causing a front end of the seal bearer to swing outward in a transverse direction when the folding convertible top is lowered.

8. Folding convertible top as claimed in claim 7, wherein the connecting rod arrangement which supports the front frame part has a front connecting rod, a rear connecting rod and a middle connecting rod, wherein the front connecting rod is pivotally coupled to the front frame part and to a front section of the intermediate connecting rod, wherein the rear connecting rod is pivotally coupled to the front frame part and to the middle frame part, and wherein the middle connecting rod is pivotally connected to the rear connecting rod by a joint and is pivotally connected to the main bearing means at a rear section of the middle connecting rod.

9. Folding convertible top as claimed in claim 8, wherein the middle coupling rod has a seal bearer which is movable via a forced coupling with the rear connecting rod during pivoting of the rear connecting rod.

10. Folding convertible top as claimed in claim 9, wherein said forced coupling for moving the seal bearer comprises a coupling rod which is connected on one end to a joint which is located inward of the seal bearer adjacent to the pivot axis of the seal bearer on the middle connecting rod, and at a second end is connected to a joint which is attached to a lower end of the rear connecting rod at a pivot axis located parallel to and offset from the pivot axis of a joint by which the rear connecting rod is coupled to the seal bearer part.

11. Folding convertible top as claimed in claim 9, wherein the seal bearer projects forwardly over the middle frame part.

12. Folding convertible top as claimed in claim 7, wherein the main bearing means which forms a four-bar mechanism having a main connecting rod which contains the rear seal bearer and which is pivotally coupled to the middle frame part by a joint and is hinged to the middle connecting rod at a control section thereof which projects above the joint by which the main connecting rod and the middle frame part are connected.

\* \* \* \* \*